March 13, 1945.　　　I. M. SILVERBERG　　　2,371,360
AIR DEFLECTOR FOR ELECTRIC FANS
Filed March 13, 1944
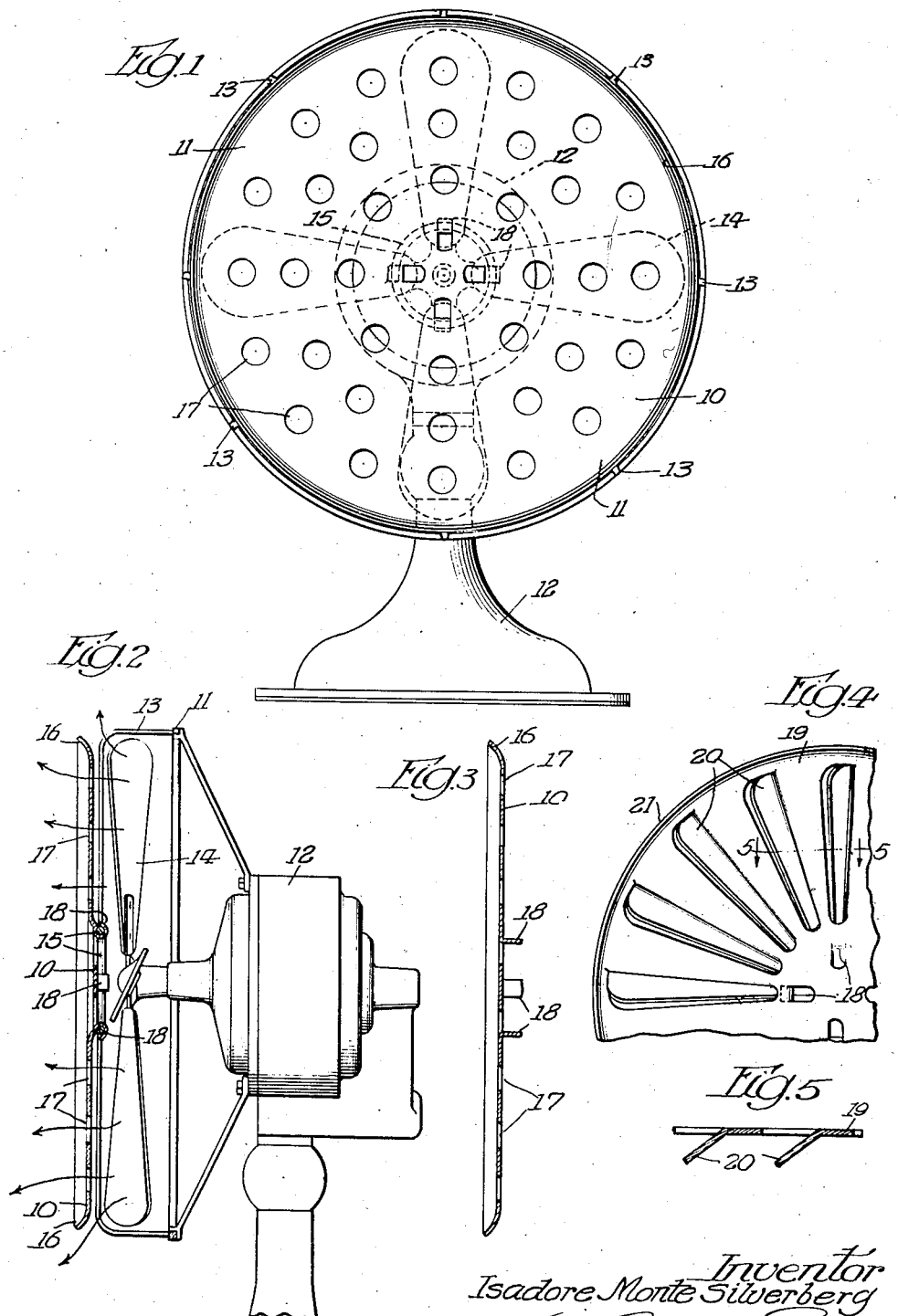
Inventor
Isadore Monte Silverberg Patented Mar. 13, 1945

2,371,360

UNITED STATES PATENT OFFICE 2,371,360

AIR DEFLECTOR FOR ELECTRIC FANS

Isadore Monte Silverberg, Chicago, Ill.

Application March 13, 1944, Serial No. 526,217

3 Claims. (Cl. 230—274)

This invention relates to improvements in means for deflecting the force of the air currents from electric fans, heaters, and the like, from blowing upon or directly striking the person, but will cause the air currents to circulate radially as well as in a direct, straight blast, and, at the same time, permit sufficient air currents to circulate or to be discharged substantially straight from the source of generation of such currents.

A further object is to provide an improved deflector attachment which will be of simple, durable and light construction, adapted to be readily applied to the casing or protecting shield of an electric fan or heater, and which will, in no manner, affect the operation of the apparatus to which it is attached, and which may be readily removed when desired.

A still further object is to provide an improved deflector of this character, which will be of a one-piece construction, and sufficiently rigid so as not to be itself deflected or distorted by the air currents.

To the attainment of these ends and the accomplishment of other new and useful objects as will appear, the invention consists in the features of novelty in substantially the construction, combination and arrangement of the several parts, hereinafter more fully described and claimed and shown in the accompanying drawing illustrating this invention, and in which Figure 1 is a front elevation of an ordinary electric fan having a deflector attachment, constructed in accordance with the principles of this invention, applied thereto.

Figure 2 is a view taken from the side of Figure 1, partly in elevation, and partly in section.

Figure 3 is a detail sectional view of the deflector.

Figure 4 is a segmental view of another form of deflector.

Figure 5 is a detail sectional view taken on line 5—5, Figure 4.

The deflector consists, essentially, of a disclike member 10 of any desired size, and constructed of any suitable material, preferably sheet material. The deflector is preferably circular in form, to conform to the configuration of the guard casing 11, which latter is secured to the fan casing 12, and the numeral 13 designates the guard wires or cage within which the fan blades 14 are arranged. The guard wire or cage is of the well-known construction, embodying a central member 15 to which the wires are secured. In some forms of fan, this central member is of an annular construction, while in other forms the central member consists of a plate.

The periphery 16 of the deflector 10 is deflected out of the plane of the body portion thereof, so as to form a substantially hollow cup-shaped member, and the body of the deflector is provided with any desired number of openings 17 arranged in any suitable manner. A portion of the deflector, preferably adjacent the center thereof, is provided with cut-out portions 18 that are deflected out of the plane of the body, so as to project beyond the face of the deflector opposite to that from which the deflected periphery 16 extends.

In use, the deflector is placed in front of the wire or cage 13 of the fan, and if the central member of the cage is annular, the portions 18 are bent around such annular member; but if the central member 15 is a solid plate, the deflected portions 18 are bent around the periphery of such central member.

With this construction, and when the deflector is secured in position, it will be manifest that the currents of air delivered by the fan blades 14 will strike the deflector plate and travel thereacross in a radial direction, to be discharged at the periphery of the deflector, the curved or deflected periphery 16 serving to direct the air currents forwardly. A portion of the air currents, however, will pass through the openings 17.

In the form of the invention shown in Fig. 4, the deflector 19 is provided with cut-out portions 20 which are arranged radially and are in the form of louvers. These louvers are arranged within the confines of the periphery of the deflector, and are spaced any desired distance from the curved or deflected periphery 21 thereof.

While, in the present exemplification of the invention, the deflector is shown as being applied to an electric fan, it is to be understood that such a deflector is equally well adapted for use with electric heaters, and therefore the claims are to be constructed broadly to include either an electric fan or electric heater.

While the preferred forms of the invention have been herein shown and described, it is to be understood that various changes may be made in the details of construction and in the combination and arrangement of the several parts, within the scope of the claims, without departing from the spirit of this invention.

What is claimed as new is:

1. As an article of manufacture and of integral construction, an air current deflector for use with an electric blower fan or the like, said deflector being formed of a single piece of sheet material of substantial diameter, the body of which is in a single plane, a portion of the deflector remote from the perpihery being cut to provide integral bendable clip anchoring or securing means for the deflector, the periphery of the deflector being deflected out of the plane of the remaining portion of the body thereof.

2. As an article of manufacture, an air current deflector of rigid and integral construction and formed from sheet material, the body of which is in a single plane, the periphery of said body being deflected to one side of the plane of the body, another portion of the body remote from the said deflected portion being cut out to provide integral bendable clips, deflected to the other side of the plane of the body to provide anchoring means for the deflector.

3. As an article of manufacture, an air current deflector of rigid and integral construction and formed from sheet material, the body of which is in a single plane, the periphery of said body being deflected to one side of the plane of the body, another portion of the body remote from the said deflected portion being cut out to provide integral bendable clips, deflected to the other side of the plane of the body to provide anchoring means for the deflector, there being air circulation openings through the body of the deflector.

ISADORE MONTE SILVERBERG.